(12) United States Patent
Pentek (10) Patent No.: US 7,770,281 B2
(45) Date of Patent: Aug. 10, 2010

(54) METHOD FOR REDEFINING THE TRAILING SHIELD THROAT HEIGHT IN A PERPENDICULAR MAGNETIC RECORDING WRITE HEAD

(75) Inventor: Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 650 days.

(21) Appl. No.: 11/746,856

(22) Filed: May 10, 2007

(65) Prior Publication Data

US 2008/0276448 A1 Nov. 13, 2008

(51) Int. Cl.
*G11B 5/127* (2006.01)
*H04R 31/00* (2006.01)

(52) U.S. Cl. .............. 29/603.12; 29/603.07; 29/603.11; 29/603.15; 29/603.16; 29/603.18; 216/62; 216/65; 216/66; 204/192.32; 451/5; 451/41; 360/317; 360/121; 360/122

(58) Field of Classification Search .............. 29/603.07, 29/603.11–603.16, 603.18; 207/192.32–192.35; 216/62, 65, 66; 451/5, 41; 360/317, 121, 360/122
See application file for complete search history.

(56) References Cited

U.S. PATENT DOCUMENTS

| | | | |
|---|---|---|---|
| RE33,949 E * | 6/1992 | Mallary et al. .............. 360/110 |
| 6,884,148 B1 * | 4/2005 | Dovek et al. .................... 451/5 |
| 7,002,775 B2 | 2/2006 | Hsu et al. |
| 7,140,095 B2 | 11/2006 | Matono et al. |
| 2005/0243464 A1 * | 11/2005 | Lille ........................... 360/126 |
| 2005/0264931 A1 * | 12/2005 | McFadyen ................... 360/126 |
| 2006/0044683 A1 * | 3/2006 | Matono et al. .............. 360/126 |
| 2006/0168798 A1 * | 8/2006 | Naka ........................ 29/603.16 |
| 2006/0215314 A1 * | 9/2006 | Chen ........................... 360/125 |

\* cited by examiner

*Primary Examiner*—Derris H Banks
*Assistant Examiner*—Jeffrey Carley
(74) *Attorney, Agent, or Firm*—Thomas R. Berthold (57) ABSTRACT

A method of forming a perpendicular magnetic recording write head having a trailing shield (TS) with a precisely defined throat height (TH) on an air-bearing slider includes depositing an electrical lapping guide (ELG) layer on the substrate adjacent to and spaced from the write pole (WP) layer. A nonmagnetic TS pad layer is deposited on both the gap layer and the ELG layer, with the TS pad layer patterned to have a front edge extending across the both the ELG layer and the gap layer and recessed from the line where the substrate will be later cut to form the slider. An ELG protection layer is patterned on the ELG layer, the TS pad layer material is removed from the ELG layer in the region recessed from the TS pad layer front edge, and the ELG layer is removed in regions not covered by the ELG protection layer. The ELG protection layer is then removed, leaving the ELG layer having a back edge collinear with the TS pad layer front edge so that the TS TH is precisely defined during subsequent lapping of the slider.

9 Claims, 11 Drawing Sheets

SECTION C-C
FIG. 8C

SECTION B-B
FIG. 8B

METHOD FOR REDEFINING THE TRAILING SHIELD THROAT HEIGHT IN A PERPENDICULAR MAGNETIC RECORDING WRITE HEAD

BACKGROUND OF THE INVENTION

1. Field of the Invention

This invention relates generally to perpendicular magnetic recording write heads for use in magnetic recording disk drives, and more particularly to a method for making a write head having a trailing shield.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The recording or write head in perpendicular magnetic recording disk drives includes a write pole for directing magnetic field to the recording layer, and one or more return poles for return of magnetic flux from the recording layer. The write head may also include a trailing shield of magnetically permeable material that faces the recording layer and is spaced from the write pole by a nonmagnetic gap. The use of a trailing shield separated from the write pole by a nonmagnetic gap slightly alters the angle of the write field and makes writing more efficient. The portion of the trailing shield that first receives the flux from the write pole must be very thin as measured in the generally perpendicular direction, i.e., perpendicular to the recording layer. This dimension is called the trailing shield's "throat height". However, it is difficult to reliably fabricate a trailing shield with a precise throat height dimension.

What is needed is a method for making a perpendicular magnetic recording write head that has a trailing shield with a precisely defined throat height.

SUMMARY OF THE INVENTION

The invention is a method of forming a perpendicular magnetic recording write head having a trailing shield (TS) with a precisely defined throat height (TH) on an air-bearing slider to be used in magnetic recording disk drives. After the write pole (WP) layer and nonmagnetic gap layer are formed on the substrate that will serve as the trailing end of the slider, an electrical lapping guide (ELG) layer of electrically conductive material is deposited on the substrate adjacent to and spaced from the WP layer. A TS pad layer of nonmagnetic material is then deposited on both the gap layer and the ELG layer, with the TS pad layer patterned to have a generally linear front edge extending across the both the ELG layer and the gap layer and recessed from the line where the substrate will be later cut to form the individual slider. An ELG protection layer, which is preferably formed of magnetically permeable material like NiFe, is deposited on the ELG layer in a region between the substrate cut line and the TS pad layer front edge. The TS pad layer material is then removed from the ELG layer in the region recessed from the TS pad layer front edge, and the ELG layer is removed in regions not covered by the ELG protection layer. Finally, the ELG protection layer is removed, leaving the ELG layer having a back edge generally collinear with the TS pad layer front edge.

In an alternative method of the invention, a bilayer TS is formed. This method takes advantage of the fact that the ELG protection layer can be formed of NiFe, the same material that can be used for the TS. Thus the ELG protection layer serves as a first TS layer. A second TS layer, preferably a lower magnetic moment material, is then formed over the ELG protection layer.

The slider is then lapped along a plane parallel to the cut line while the electrical resistance of the ELG is monitored. When a predetermined resistance value is achieved lapping stops. This defines generally the air-bearing surface (ABS) of the slider and thus the TS TH because the back edge of the ELG has been aligned with the front edge of the TS pad layer.

For a fuller understanding of the nature and advantages of the present invention, reference should be made to the following detailed description taken together with the accompanying figures.

DETAILED DESCRIPTION OF THE INVENTION

Figure 1A:
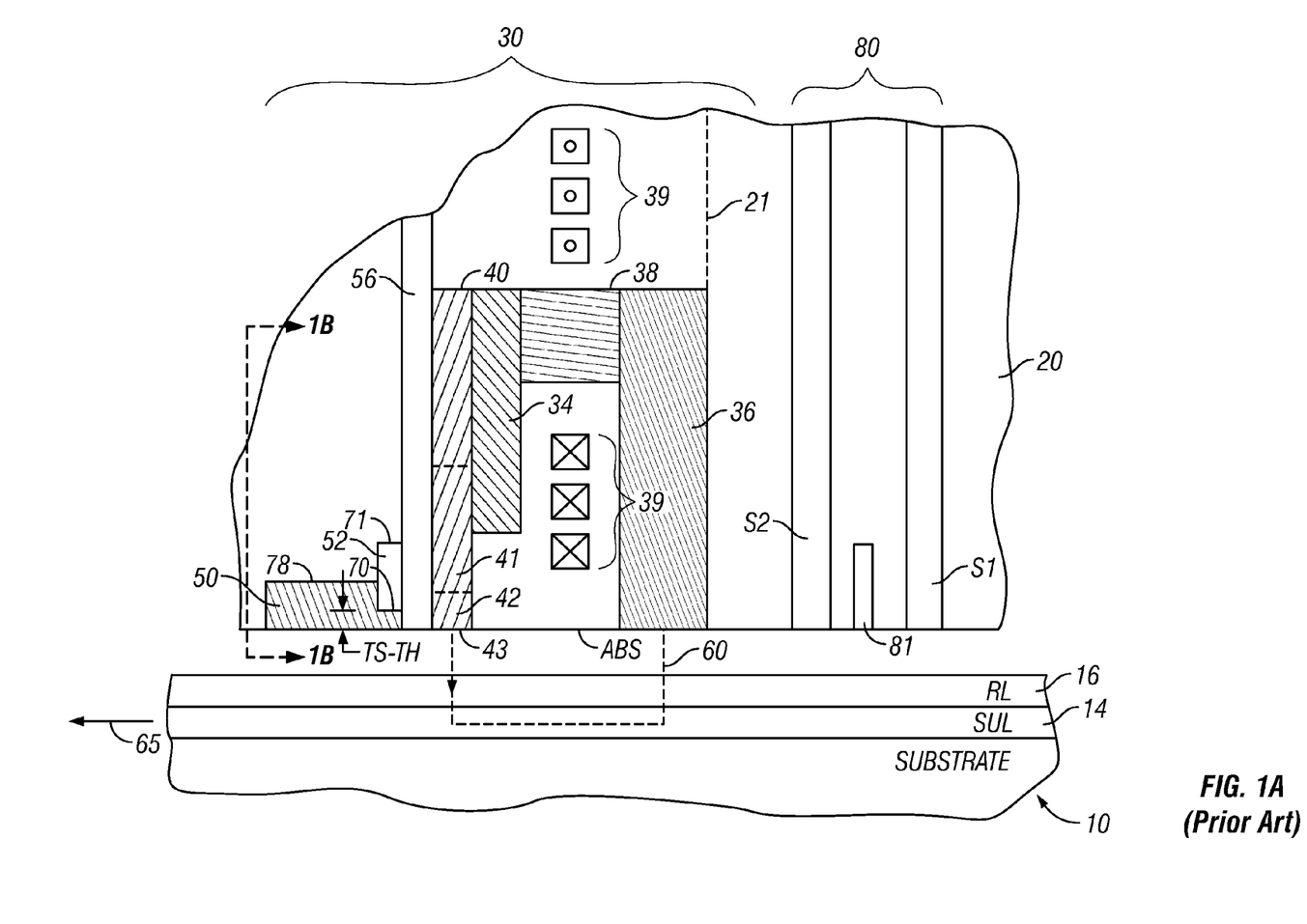
FIG. 1A is a side sectional view of a prior art perpendicular magnetic recording system showing a read head, a write head, and a recording medium.

FIG. 1A is a side sectional view of a prior art perpendicular magnetic recording write head, read head and a recording medium taken through a central plane that intersects a data track on the medium. As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a single write pole type of recording or write head 30. The recording head 30 includes a yoke made up of the main pole 34, flux return pole 36, and yoke stud 38 connecting the main pole and return pole 36; and a thin film coil 39 shown in section wrapped around yoke stud 38. A flared write pole (WP) 40 is part of the main pole 34 and has a flared portion 41 and a pole tip 42 with an end 43 that faces the outer surface of medium 10. Write current through coil 39 induces a magnetic field (shown by dashed line 60) from the WP 40 that passes through the RL 16 (to magnetize the region of the RL 16 beneath the WP 40), through the flux return path provided by the SUL 14, and back to the return pole 36. The recording head is typically formed on a trailing surface 21 of an air-bearing slider 20 that has its air-bearing surface (ABS) supported above the surface of medium 10.

A magnetoresistive (MR) read head 80 comprised of a MR sensing element 81 located between MR shields S1 and S2 is also deposited on the trailing end of the slider 20 prior to the deposition of the layers making up the write head 30. As depicted in FIG. 1A, trailing surface 21 may be a nonmagnetic layer deposited on the MR shield S2. In FIG. 1A, the medium 10 moves past the recording head 30 in the direction indicated by arrow 65, so the portion of slider 20 that supports the MR head 80 and write head 30 is often called the slider "trailing" end, and the surface perpendicular to the slider ABS on which the write head 30 is located is often called the "trailing" surface.

The RL 16 is illustrated with perpendicularly recorded or magnetized regions, with adjacent regions having opposite magnetization directions, as represented by the arrows. The magnetic transitions between adjacent oppositely-directed magnetized regions are detectable by the MR sensing element 81 as the recorded bits.

FIG. 1A also illustrates a trailing shield (TS) 50 and a TS pad 52 that are separated from WP 40 by a nonmagnetic gap layer 56. The TS 50 has a throat height (TH) defined generally as the distance between the ABS and a front edge 70 of the TS pad 52. The TS 50 has a total thickness defined generally by the ABS and a back edge 78. The TS 50 is formed of magnetically permeable material and TS pad 52 is formed of nonmagnetic material. The TS 50 separated from the WP 40 by nonmagnetic gap 56 slightly alters the angle of the write field and makes writing more efficient. The portion of the TS that first receives the flux from WP 40 must be very thin, for example about 50 nm. However, it is difficult to reliably fabricate a TS to such small thicknesses. For that reason a nonmagnetic TS pad 52 is used. The TS pad 52 has a front edge 70 near the ABS and a back edge 71 recessed from the front edge 70. The TS pad 52 allows the TS to have a TH much thinner that the thickness of the remaining portion of the TS. A perpendicular magnetic recording write head with a TS and a TS pad, like that depicted in FIG. 1A, is described in pending application Ser. No. 11/090,456 filed Mar. 25, 2005, published as US2006/215314 A1, and assigned to the same assignee as this application.

Figure 1B:
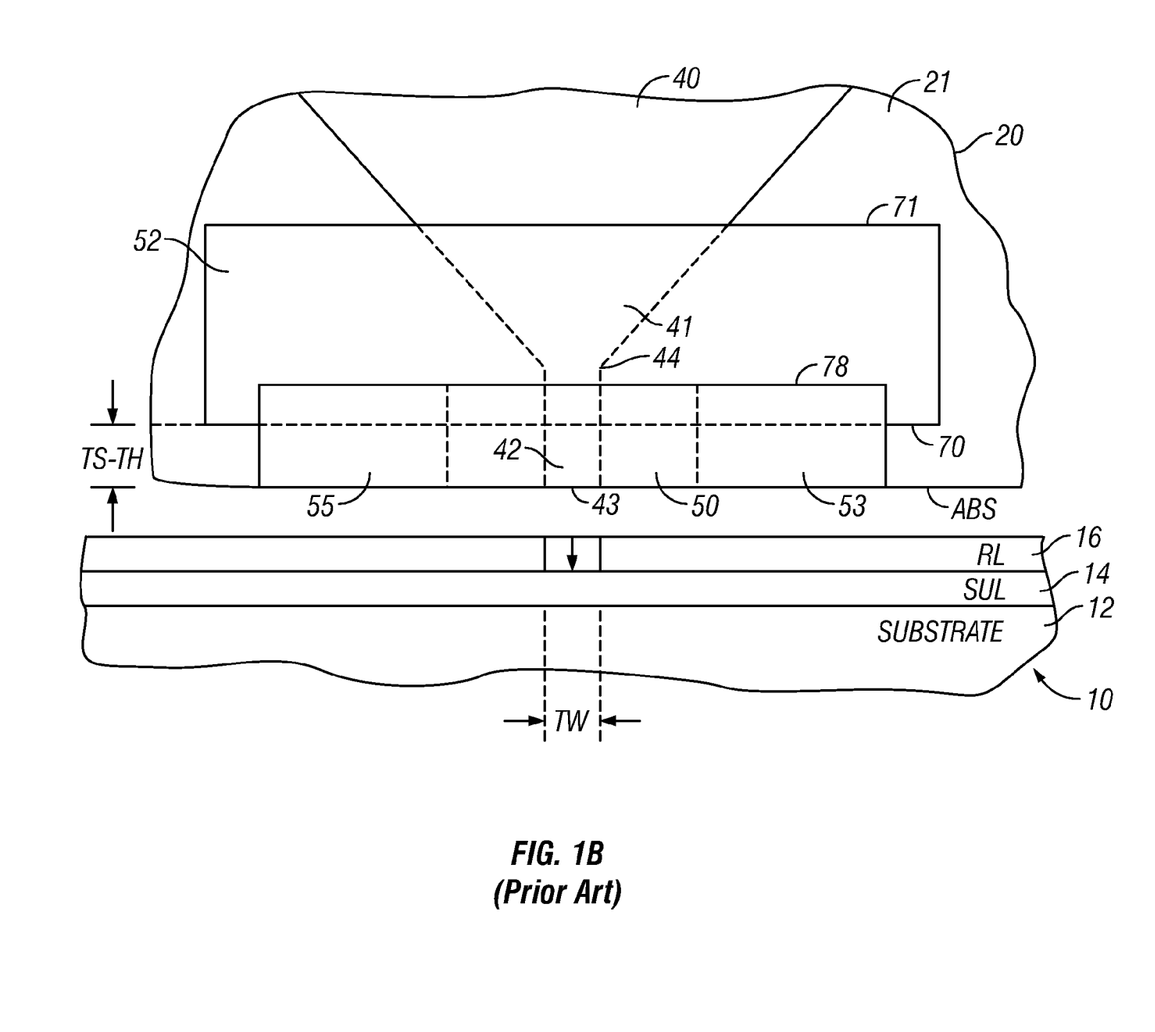
FIG. 1B is a view in the direction 1B-1B of FIG. 1A and shows the write pole (WP), the wraparound shield (WAS), and the trailing shield (TS) pad for defining the TS throat height (TH).

FIG. 1B is a view in the direction 1B-1B of FIG. 1A to illustrate the WP 40, the TS 50 and the TS pad 52 on trailing surface 21 of slider 20. To simplify the illustration of FIG. 1B, neither the gap layer 56 nor the layers between WP 40 and the surface 21, shown in FIG. 1A, are shown in FIG. 1B. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a throat height (TH) which is generally the distance from end 43 to flare point 44. As shown in FIG. 1B, the two side walls of WP tip 42 define its width in the cross-track direction, which substantially defines the track-width (TW) of the data recorded in the RL 16. The region of the WP 40 above the flare region 41 is substantially wider than WP tip 42 below the flare region 41 and the flare point 44 is the transition point where the WP 40 begins to widen with distance from the ABS. The flare angle between flare region 41 and WP 42 is between 90 and 180 degrees, typically between about 120 and 150 degrees.

FIG. 1B also illustrates the TS 50 and TS pad 52. The portions identified as 53, 55 on opposite ends of TS 50 are side shields which, together with TS 50 form a wraparound shield (WAS) that generally surrounds the WP tip 42. The TH for the TS 50 is the distance from the ABS to the front edge 70 of the TS pad 52.

Figure 1C:
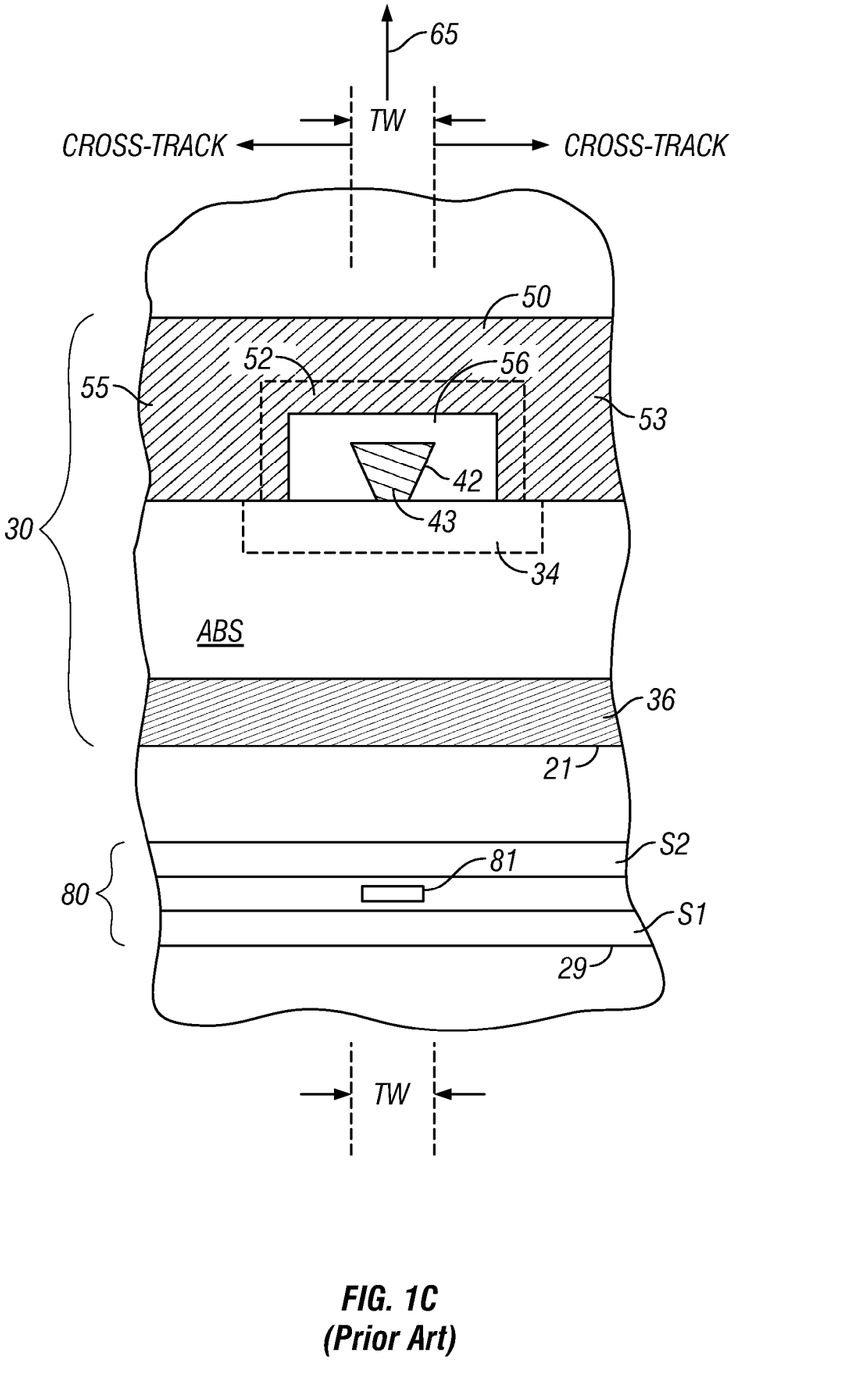
FIG. 1C is a view from the air-bearing surface (ABS) of the write head and read head in FIG. 1A and shows the WAS.

FIG. 1C illustrates the write head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider 20 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The recording medium 10 moves relative to the head 30 in the direction 65, which is called the along-the-track direction. The width of the end 43 of WP tip 42 substantially defines the track-width (TW) of the data tracks in the RL 16. The main pole 34 is shown with dashed lines because it is recessed from the ABS (see FIG. 1A). The direction perpendicular to direction 65 and parallel to the plane of the ABS is called the cross-track direction.

The WAS that includes side shields 53, 55 and TS 50 is described in detail as a shield for a conventional perpendicular recording head in U.S. Pat. No. 7,002,775 B2 assigned to the same assignee as this application. The shields 50, 53, 55 all have ends substantially at the recording-layer-facing surface. The shields 50, 53, 55 are typically connected to one another and substantially surround the WP tip 42 to from the WAS. The TS 50 and side shields 53, 55 are separated from WP tip 42 by nonmagnetic gap material, typically alumina, which forms the gap layer 56. The WAS separated from the WP tip 42 by gap layer 56 alters the angle of the write field and improves the write field gradient at the point of writing, and also shields the writing field at regions of the medium 10 away from the track being written. The WAS is shown as a "floating" shield, meaning that is not connected to the return pole 36. However, the WAS may be connected to either the return pole 36 or other portions of the yoke by flux-conducting material. In other variations of the write head 30, only a TS may be used without side shields. The TS may be either "floating" or connected to return pole 36.

FIG. 1C also illustrates the magnetoresistive (MR) read head 80 that includes the MR sensor 81 located between MR shields S1, S2. The films making up MR head 80 and write head 30 as shown in FIG. 1C are formed in succession on the trailing end of air-bearing slider 20, by a series of thin film deposition, etching and lithographic patterning processes. As shown in FIG. 1C, the films making up (MR) read head 80 are formed on substrate surface 29 and the films making up write head 30 are formed on substrate surface 21, which is typically a layer of nonmagnetic material, like alumina, that separates write head 30 from read head 80.

The yoke and shields of write head 30 are formed of soft ferromagnetic material, such as alloys of NiFe, CoFe and NiFeCo that are typically formed by electroplating. The WP 40 is formed of a high-moment material, such as a high-moment CoFe alloy, that is typically formed by sputter deposition, and may be a laminated structure.

Figure 2A:
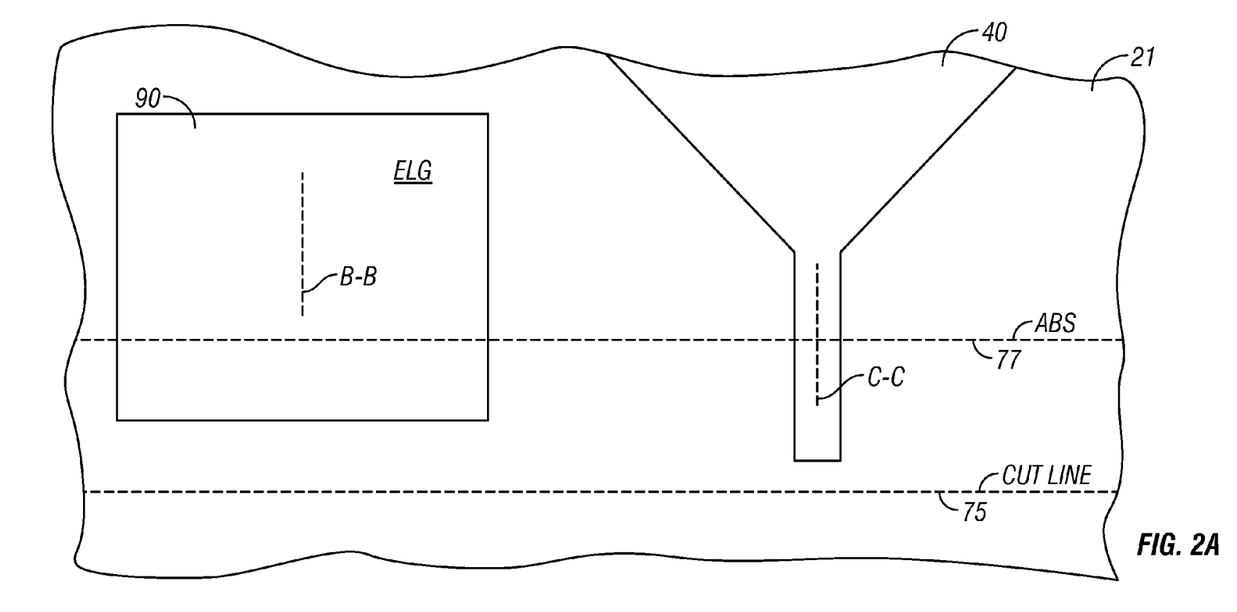
FIG. 2A is a view of the substrate surface of a wafer on which the write head is fabricated and shows the WP and an electrical lapping guide (ELG) layer at one point in the process of this invention.
Figure 2B:
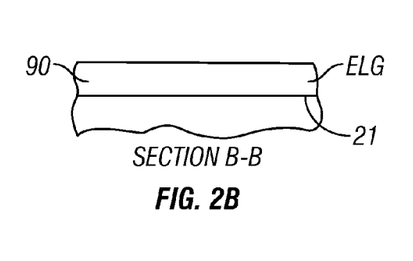
FIG. 2B is a sectional view through plane B-B of FIG. 2A.
Figure 2C:
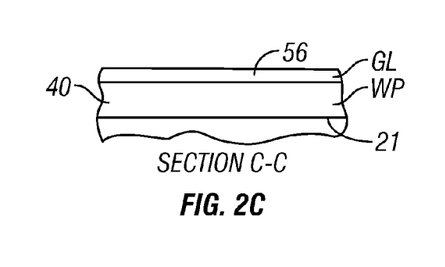
FIG. 2C is a sectional view through plane C-C of FIG. 2A.

FIG. 2A is a view of the substrate surface 21 of a wafer on which the write head is fabricated and shows the WP 40 at one point in the process of this invention. The wafer is later cut into rows and the rows then cut into individual sliders. A line 75 is shown as a cut line for separating the wafer into rows. After separation into rows, the rows are later cut into the individual sliders. Eventually the sliders are lapped, either individually or at the row level, to remove material between cut line 75 and line 77, to form the ABS. In the process of this invention an electrical lapping guide (ELG) layer 90 of electrically conductive material is also formed on substrate surface 21. As is well known in the disk drive read/write head fabrication technology, an ELG is used to control the lapping so that lapping is stopped at the precise line desired for the ABS. The electrical resistance is measured and as the ELG material is removed, lapping is terminated when the resistance reaches a predetermined value. The ELG layer 90 is preferably gold (Au) sputter deposited to a thickness of about 25 nm, but other electrically conductive materials may also be used, such as Rh, Ru and NiCr. In the process of this invention the ELG layer 90 is used to precisely define the TH of TS 50. FIG. 2B is a sectional view through plane B-B of FIG. 2A and shows the ELG layer 90 on the substrate surface 21. FIG. 2C is a sectional view through plane C-C of FIG. 2A and shows the WP 40 and gap layer (GL) 56 on the substrate surface 21.

Figure 3A:
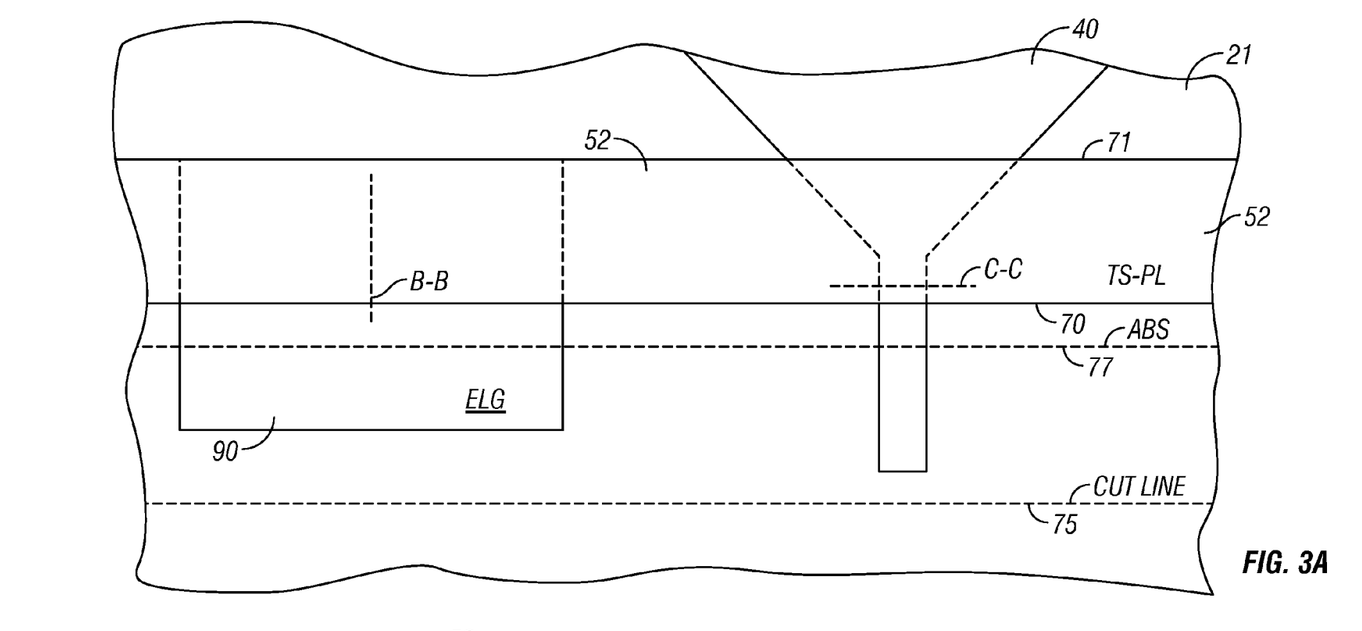
FIG. 3A is a view of the substrate surface of a wafer after deposition and patterning of the TS pad layer.
Figure 3B:
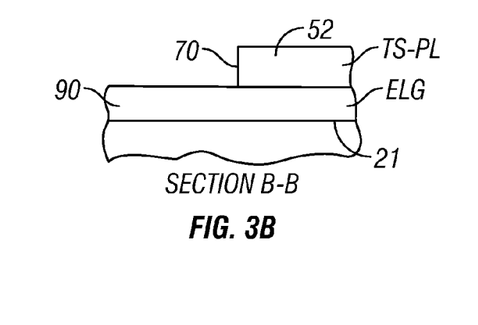
FIG. 3B is a sectional view through plane B-B of FIG. 3A.
Figure 3C:
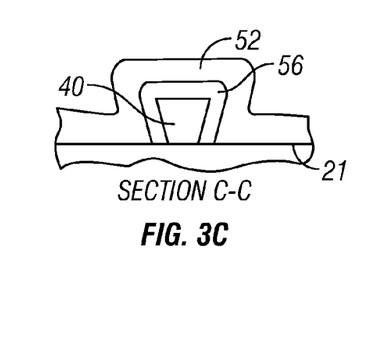
FIG. 3C is a sectional view through plane C-C of FIG. 3A.

The material for the TS pad layer 52 (FIG. 1A) is then sputter deposited over the structure of FIG. 2A. The TS pad layer material is preferably tantalum oxide ($Ta_2O_5$) with a thickness of about 60-80 nm, but other nonmagnetic materials may be used, such as alumina ($Al_2O_3$), silicon dioxide ($SiO_2$) and silicon nitride ($Si_3N_4$). The structure is then patterned with photoresist to define the extent of the TS pad layer, the TS pad layer material not protected by the photoresist is removed by reactive ion etching (RIE), and the photoresist is then stripped. The resulting structure is shown in FIG. 3A and shows the TS pad layer (TS-PL) 52 with a front edge 70 and back edge 71 extending over the ELG layer 90 and the WP 40. The region of the ELG layer 90 recessed from TS-PL front edge 70 is covered with the TS-PL and the region of the ELG layer 90 between the cut line 75 and the TS-PL front edge 70 is exposed. FIG. 3B is a sectional view through plane B-B of FIG. 3A and shows the ELG layer 90 and the TS-PL 52 with front edge 70 on the substrate surface 21. FIG. 3C is a sectional view through plane C-C of FIG. 3A and shows the WP 40, GL 56 and TS-PL 52 on the substrate surface 21.

Figure 4A:
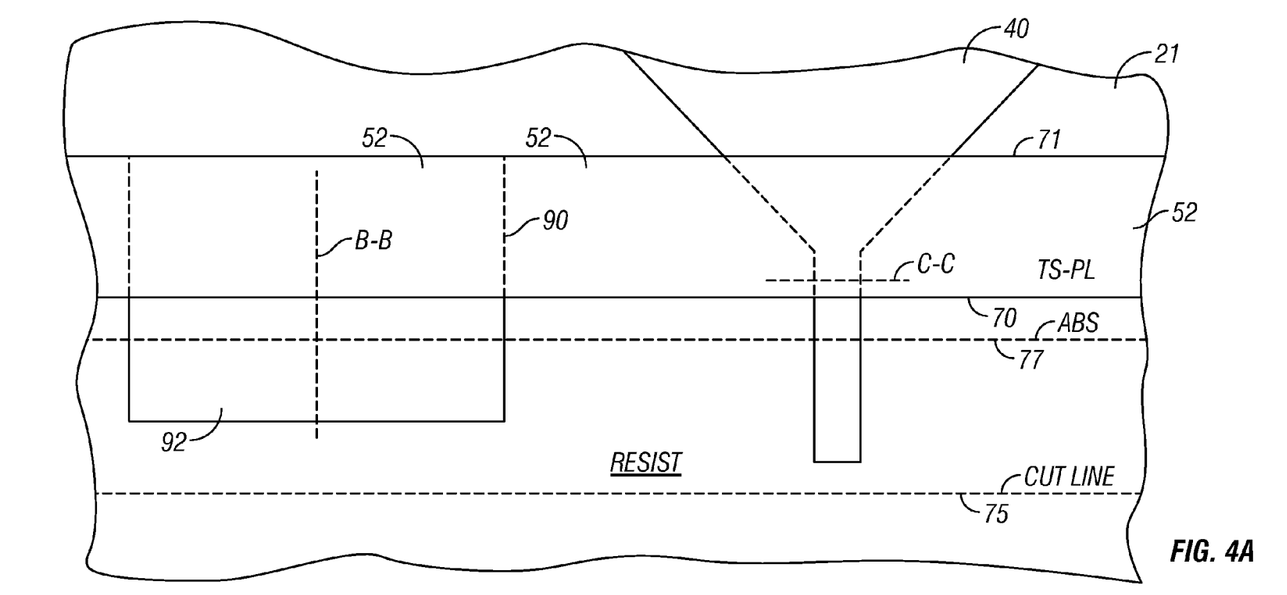
FIG. 4A is a view of the substrate surface of a wafer after photoresist patterning and deposition of an ELG protection layer into the opening defined the photoresist pattern.
Figure 4B:
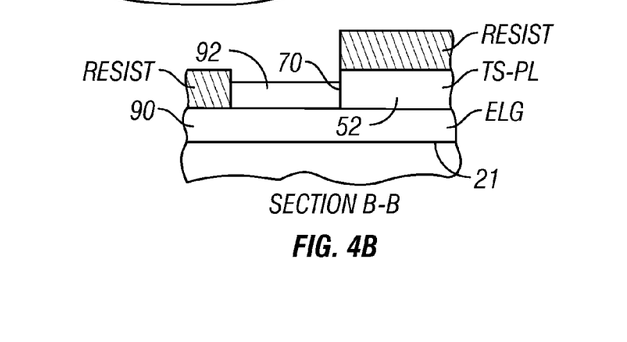
FIG. 4B is a sectional view through plane B-B of FIG. 4A.
Figure 4C:
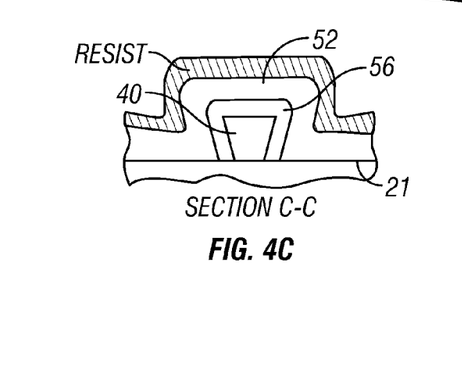
FIG. 4C is a sectional view through plane C-C of FIG. 4A.

Next the structure is covered with photoresist, and the photoresist is patterned and exposed to open an area above ELG layer 90 in the region between the cut line 75 and the TS-PL front edge 70. The region of the ELG layer 90 recessed from TS-PL front edge 70 remains covered with the TS-PL 52 with the resist layer covering TS-PL 52. An ELG protection layer 92 is then deposited into the opening. The resulting structure is shown in FIG. 4A. The ELG protection layer 92 is preferably a NiFe alloy electroplated to a thickness of about 50 nm onto the electrically conductive ELG layer 90. Other materials that may be used for the ELG protection layer 92 include NiP and CoFe. FIG. 4B is a sectional view through plane B-B of FIG. 4A and shows the ELG layer 90, the TS-PL 52 with front edge 70, the resist layer and the ELG protection layer 92 deposited into the opening defined by the resist pattern. FIG. 4C is a sectional view through plane C-C of FIG. 4A and shows the WP 40, GL 56 and TS-PL 52 covered by the resist layer.

Figure 5A:
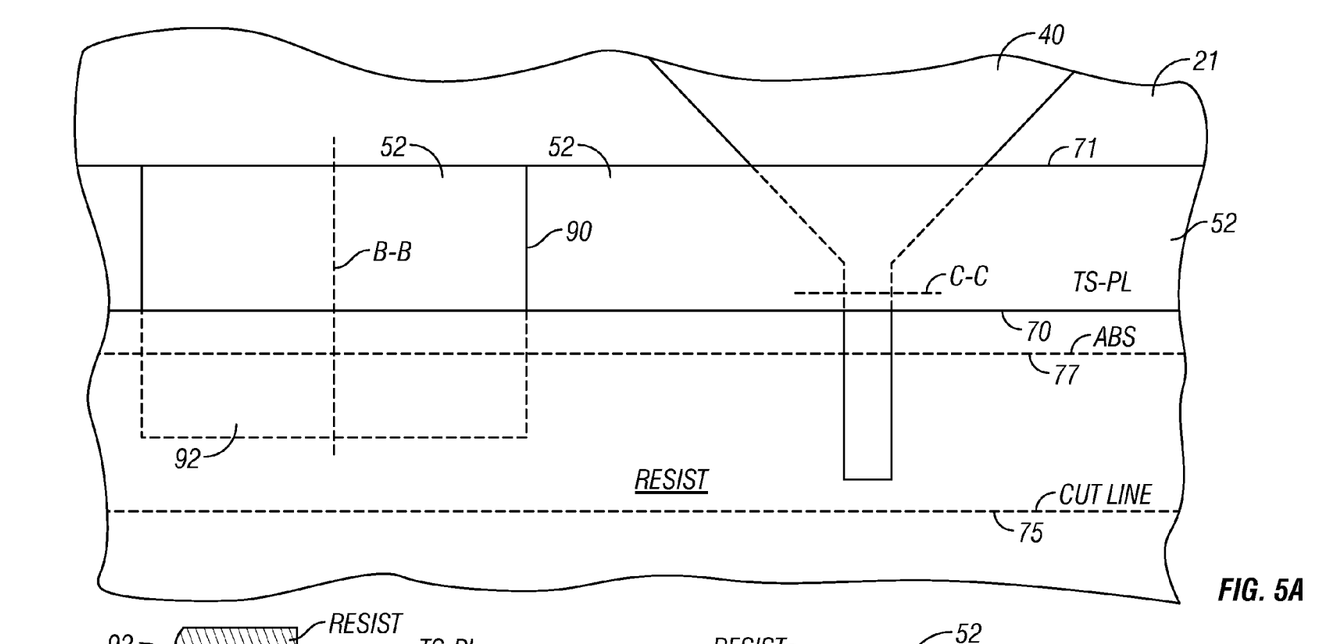
FIG. 5A is a view of the substrate surface of a wafer after photoresist patterning to define an opening above a portion of the ELG layer to expose the TS pad layer.
Figure 5B:
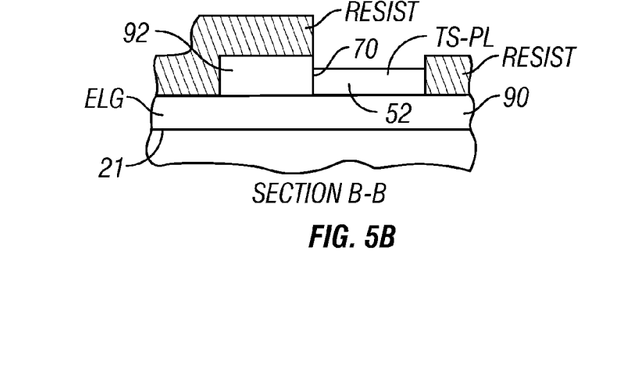
FIG. 5B is a sectional view through plane B-B of FIG. 5A.
Figure 5C:
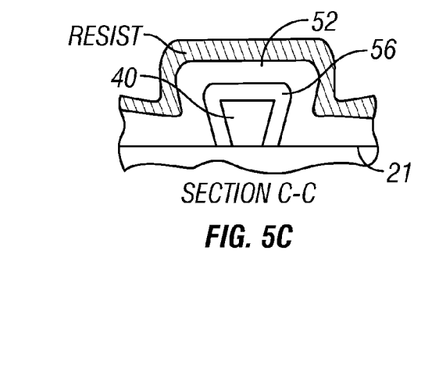
FIG. 5C is a sectional view through plane C-C of FIG. 5A.

The resist in FIG. 4C is then stripped. Next the structure is again covered with photoresist, and the photoresist is patterned and exposed to open an area above ELG layer 90 in the region recessed from the TS-PL front edge 70 to expose the TS-PL 52. The resulting structure is shown in FIG. 5A. FIG. 5B is a sectional view through plane B-B of FIG. 5A and shows the ELG layer 90 with the exposed TS-PL 52 with front edge 70 in the opening defined by the resist pattern. FIG. 5C is a sectional view through plane C-C of FIG. 5A and shows the WP 40, GL 56 and TS-PL 52 covered by the resist layer.

Figure 6A:
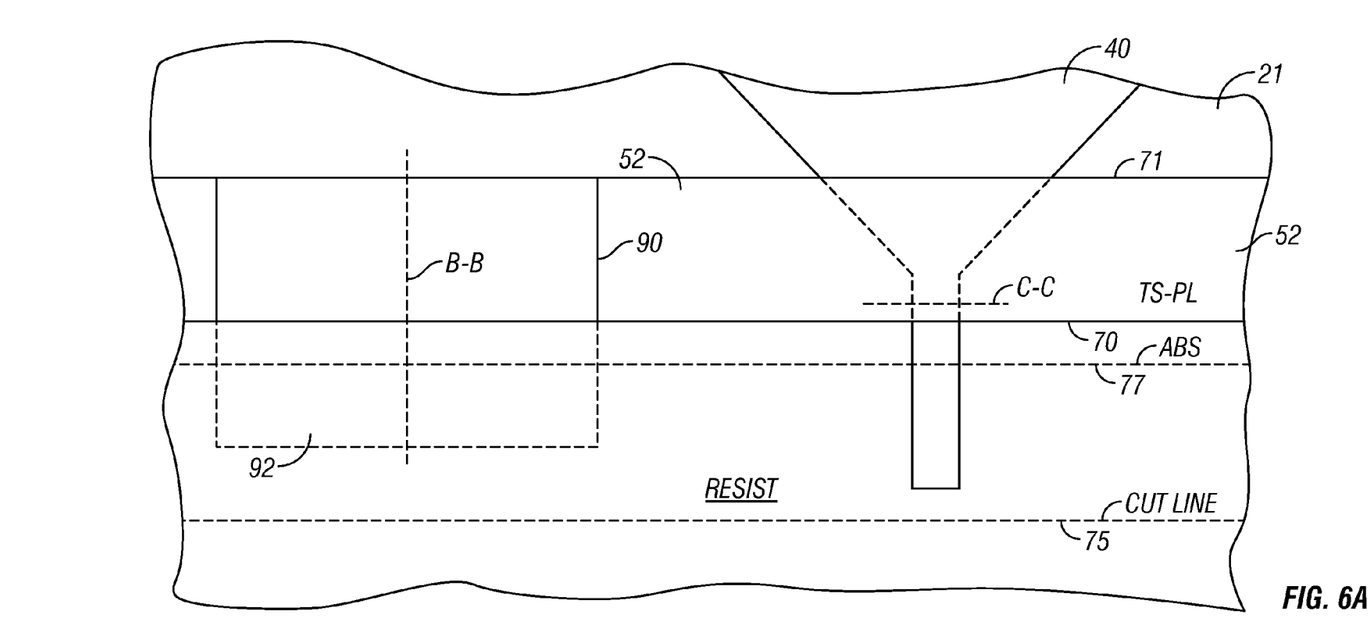
FIG. 6A is a view of the substrate surface of a wafer after removal of the exposed TS pad layer over a portion of the ELG layer.
Figure 6B:
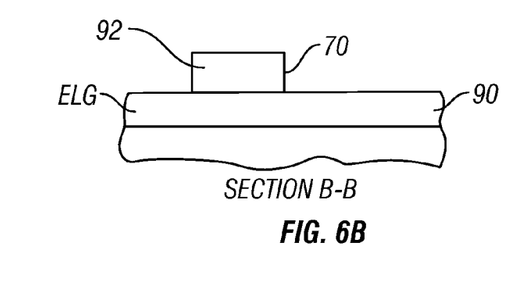
FIG. 6B is a sectional view through plane B-B of FIG. 6A.
Figure 6C:
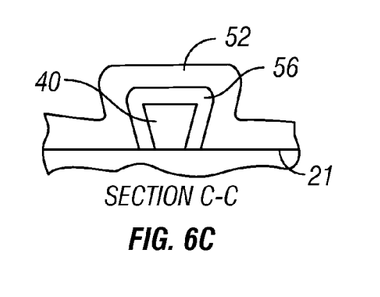
FIG. 6C is a sectional view through plane C-C of FIG. 6A.

The exposed TS-PL 52 in the opening shown in FIGS. 5A-5B is then removed by RIE and the resist stripped. The resulting structure is shown in FIG. 6A. FIG. 6B is a sectional view through plane B-B of FIG. 6A and shows the ELG layer 90 with the ELG protection layer 92 over it and having a back edge coincident with the TS-PL front edge 70. FIG. 6C is a sectional view through plane C-C of FIG. 6A and shows the WP 40, GL 56 and TS-PL 52.

Figures 7A, 7B, 7C:
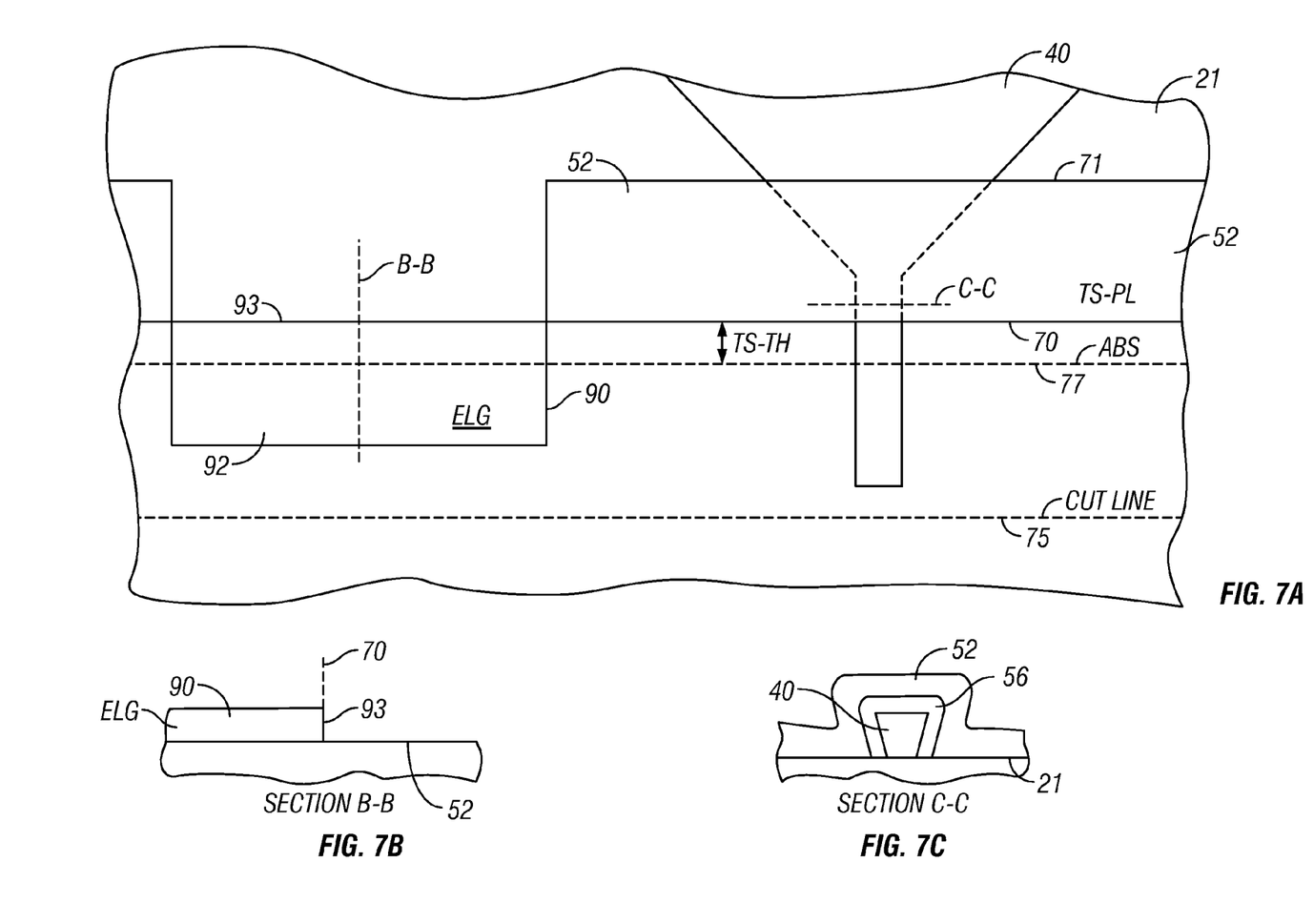
FIG. 7A is a view of the substrate surface of a wafer after removal of the ELG layer in the region not protected by the ELG protection layer and removal of the ELG protection layer, leaving the ELG layer with a back edge coincident with the front edge of the TS pad layer.
FIG. 7B is a sectional view through plane B-B of FIG. 7A.
FIG. 7C is a sectional view through plane C-C of FIG. 7A.

Next, a layer of photoresist is then deposited over the structure of FIG. 6A and patterned to expose the entire ELG layer 90, i.e., both the portion between the cut line 75 and TS-PL front edge 70 that is covered with the ELG protection layer 92 and the portion recessed from TS-PL front edge 70. The WP 40 is protected by the resist layer. The ELG layer 90 is then ion milled using Ar ions and end point detection (EPD) on the ELG layer material. This removes all of the ELG layer 92 except that portion protected by the ELG protection layer 92, which acts as a milling mask. The ion milling does not affect the WP40 which is protected by the resist layer. The ELG protection layer 92 is then removed by chemical etch and the resist stripped. The resulting structure is shown in FIG. 7A. FIG. 7B is a sectional view through plane B-B of FIG. 7A and shows the ELG layer 90 with its back edge 93 coincident with the TS-PL front edge 70. The TS TH is defined by the ABS (line 77) and the TS-PL front edge 70, which is now aligned with the back edge 93 of ELG layer 92. FIG. 7C is a sectional view through plane C-C of FIG. 7A and shows the WP 40, GL 56 and TS-PL 52.

Figure 8A:
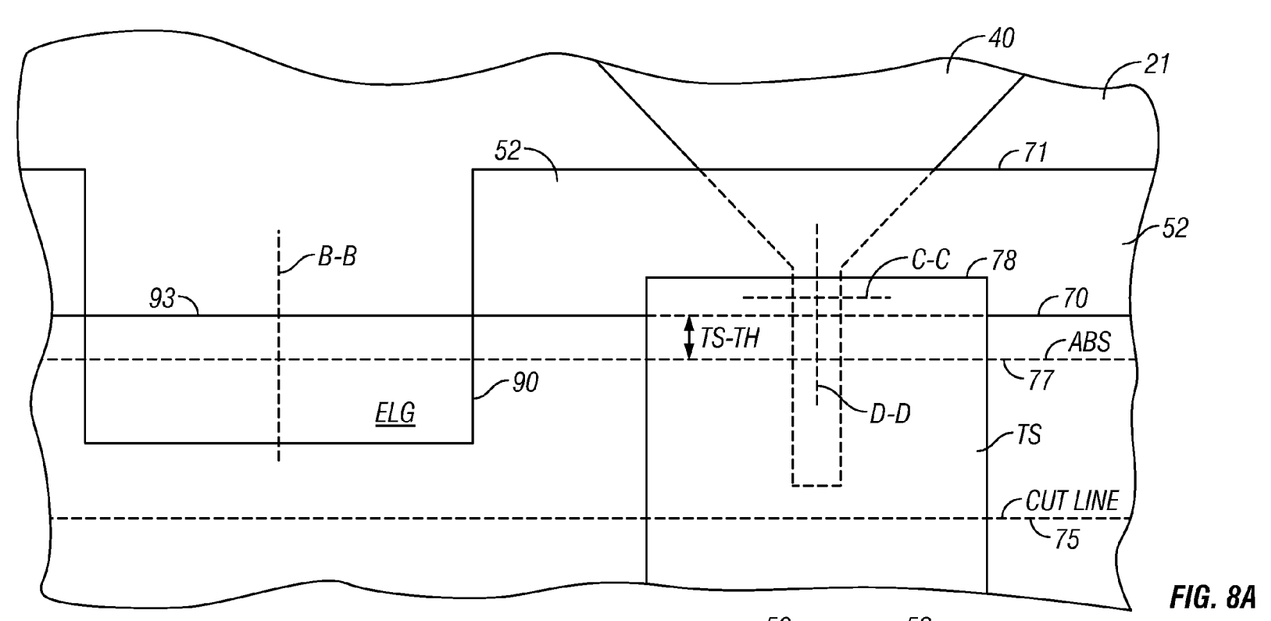
FIG. 8A is a view of the substrate surface of a wafer after photoresist patterning to define an opening above the WP, deposition of the TS layer into the opening and stripping of the resist.
Figure 8B:
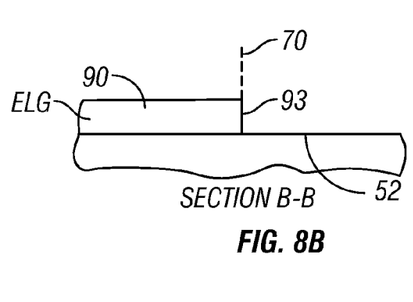
FIG. 8B is a sectional view through plane B-B of FIG. 8A.
Figure 8C:
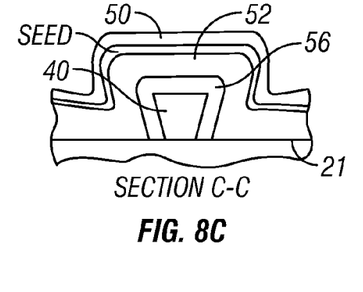
FIG. 8C is a sectional view through plane C-C of FIG. 8A.
Figure 8D:
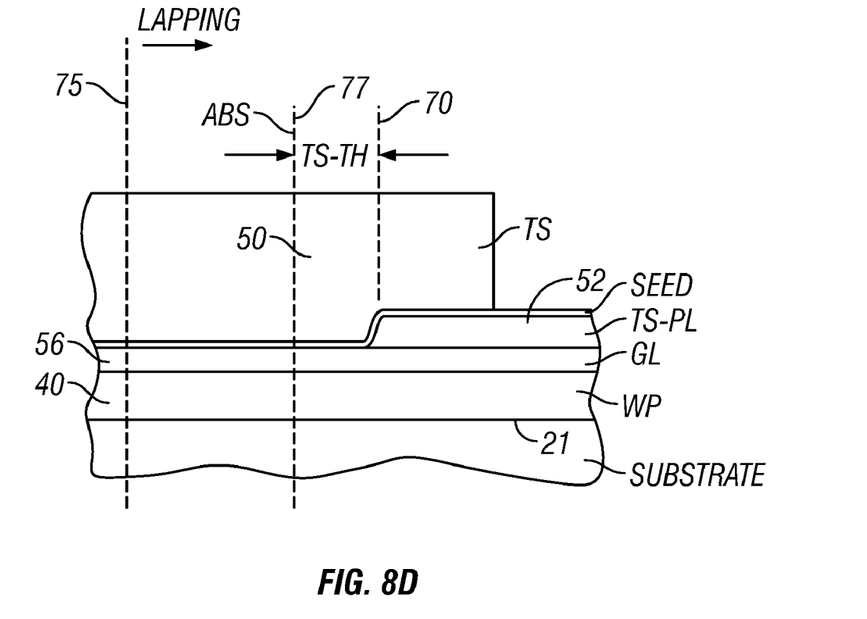
FIG. 8D is a sectional view through plane D-D of FIG. 8A.

Next the ELG layer 92 is covered with photoresist and an electrically conductive nonmagnetic seed layer is deposited over the WP 40. The seed layer may be Ru, Rh, Ir, or NiCr, and is typically sputter deposited to a thickness of about 20-60 nm. Photoresist is then patterned over the seed layer and WP 40 to define an opening for the TS layer. The opening is defined along line 78 which is to be the back edge for the TS 50. The TS material is then deposited into the opening by electroplating onto the seed layer. The resist is then stripped. The resulting structure is shown in FIG. 8A. FIG. 8B is a sectional view through plane B-B of FIG. 8A and shows the ELG layer 90 with its back edge 93 coincident with the TS-PL front edge 70. FIG. 8C is a sectional view through plane C-C of FIG. 8A and shows the WP 40, GL 56, TS-PL 52, the seed layer, and the TS layer 50. FIG. 8D is a sectional view through plane D-D of FIG. 8A and shows the TS and the definition of TS TH between the ABS and line 70.

After formation of the TS, the wafer is cut along line 75 and then lapped. The lapping may be done on a row of wafers, or at the individual slider level after the sliders are cut from the rows. The lapping is performed along a plane parallel to cut line 75 and perpendicular to the substrate surface 21, and in the direction shown by the arrow in FIG. 8D. During lapping the electrical resistance of ELG layer 90 is monitored. The resistance decreases generally proportionally with the amount of ELG material that is removed. The electrical resistance of the amount of ELG material between line 77 and back edge 93 (FIG. 8A) is known. When this predetermined resistance value is achieved lapping stops. This defines generally the ABS and thus the TS TH because the back edge 93 has been aligned with the front edge 70 of the TS-PL 52.

Figure 9:
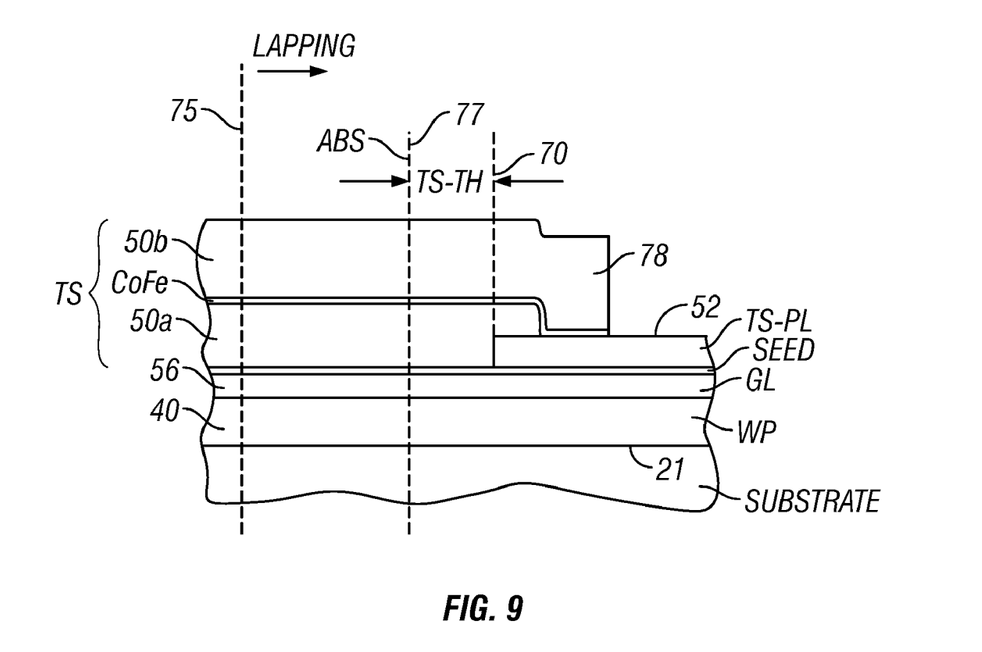
FIG. 9 is a sectional view corresponding generally to the view of FIG. 8D but following an alternative method according to this invention.

In an alternative method of this invention, a bilayer TS is formed. FIG. 9 is a view at the end of the alternative method, corresponding to FIG. 8D. This method takes advantage of the fact that the ELG protection layer 92 can be formed of NiFe, the same material that can be used for the TS. Thus a first TS layer 50a is formed during the steps shown in FIG. 4A by also patterning the resist to define an opening above WP 40 to define the first TS layer 50a. The NiFe is then electroplated into both openings so that ELG protection layer 92 and the first TS layer 50a are formed at the same time. Next the ELG layer 90 is protected with resist and a thin CoFe layer is deposited over the WP 40 to cover the first TS layer 50a and the TS-PL 52, as shown in FIG. 9. The TS-PL layer 52 is then removed in the ELG region as described and shown in FIG. 6A. Next the structure is covered with photoresist and the photoresist patterned to define an opening above WP 40 to deposit the second TS layer 50b. This opening is defined along line 78 which is to be the back edge for the second TS layer 50b. The material of second TS layer 50b is then electroplated into this opening onto the thin CoFe layer and the resist is stripped. The material of the second TS layer is preferably a material that has a lower magnetic moment than the material of the first TS layer. For example, the first TS layer 50a used as the ELG protection layer may be Ni22Fe78 and the second TS layer 50b may be a NiFe material with a lower magnetic moment, like Ni45Fe55 or Ni80Fe20. However, the first and second TS layers may also be formed of material with the same or similar moments. Next as described and shown in FIG. 7A, the ELG layer 90 is ion milled to leave only the portion protected by the ELG protection layer 92, which acts as a milling mask, and then the ELG protection layer 92 is removed by RIE.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method of forming a perpendicular magnetic recording write head having a trailing shield (TS), the write head with TS being formed on a substrate, the substrate being later cut along a line to form a plane generally perpendicular to the substrate, the method comprising:

forming a write pole (WP) of magnetic material on the substrate;
   depositing a gap layer of nonmagnetic material on the WP;
   depositing an electrical lapping guide (ELG) layer of electrically conductive material on the substrate adjacent to and spaced from the WP;
   forming a patterned trailing shield (TS) pad layer of nonmagnetic material on the ELG layer and the gap layer, the TS pad layer having a generally linear front edge extending across the ELG layer and the gap layer and recessed from the substrate cut line;
   depositing an ELG protection layer on the ELG layer in a region between the substrate cut line and the TS pad layer front edge;
   removing the TS pad layer material from the ELG layer in the region recessed from the TS pad layer front edge;
   removing the ELG layer in regions not covered by the ELG protection layer; and
   removing the ELG protection layer, leaving the ELG layer having a back edge generally collinear with the TS pad layer front edge.

2. The method of claim 1 further comprising forming a TS layer of magnetically permeable material over the TS pad layer and gap layer.

3. The method of claim 2 further comprising, after the substrate has been cut along said cut line, lapping the substrate in said perpendicular plane until the electrical resistance from the ELG layer reaches a predetermined value, thereby defining a TS throat height from said lapped plane to said TS pad layer front edge.

4. The method of claim 2 wherein forming a TS layer comprises depositing a seed layer over the TS pad layer and gap layer, forming a resist pattern on the seed layer leaving an opening in a region between the cut line and a line substantially parallel to and recessed from the TS pad layer front edge, and depositing the TS layer material into said opening.

5. The method of claim 1 wherein depositing an ELG protection layer on the ELG layer comprises forming a resist pattern on the substrate leaving an opening in said region between the substrate cut line and the TS pad layer front edge, electroplating the ELG protection layer onto the ELG layer in said opening, and thereafter removing the resist.

6. The method of claim 1 wherein removing the TS pad layer material from the ELG layer comprises forming a resist pattern on the substrate leaving an opening in said region recessed from the TS pad layer front edge to expose the TS pad layer in said region, etching away the exposed TS pad layer, and thereafter removing the resist.

7. The method of claim 1 wherein the ELG protection layer comprises magnetically permeable material and further comprising simultaneously depositing the magnetically permeable ELG material layer on the ELG layer in a region between the substrate cut line and the TS pad layer front edge and over the gap layer and WP, the magnetically permeable material over the gap layer and WP forming a first TS layer.

8. The method of claim 7 further comprising depositing a second TS layer of magnetically permeable material over the first TS layer and the TS pad layer.

9. The method of claim 8 wherein the second TS layer has a different magnetic moment than the first TS layer.

* * * * *